Patented July 29, 1924.

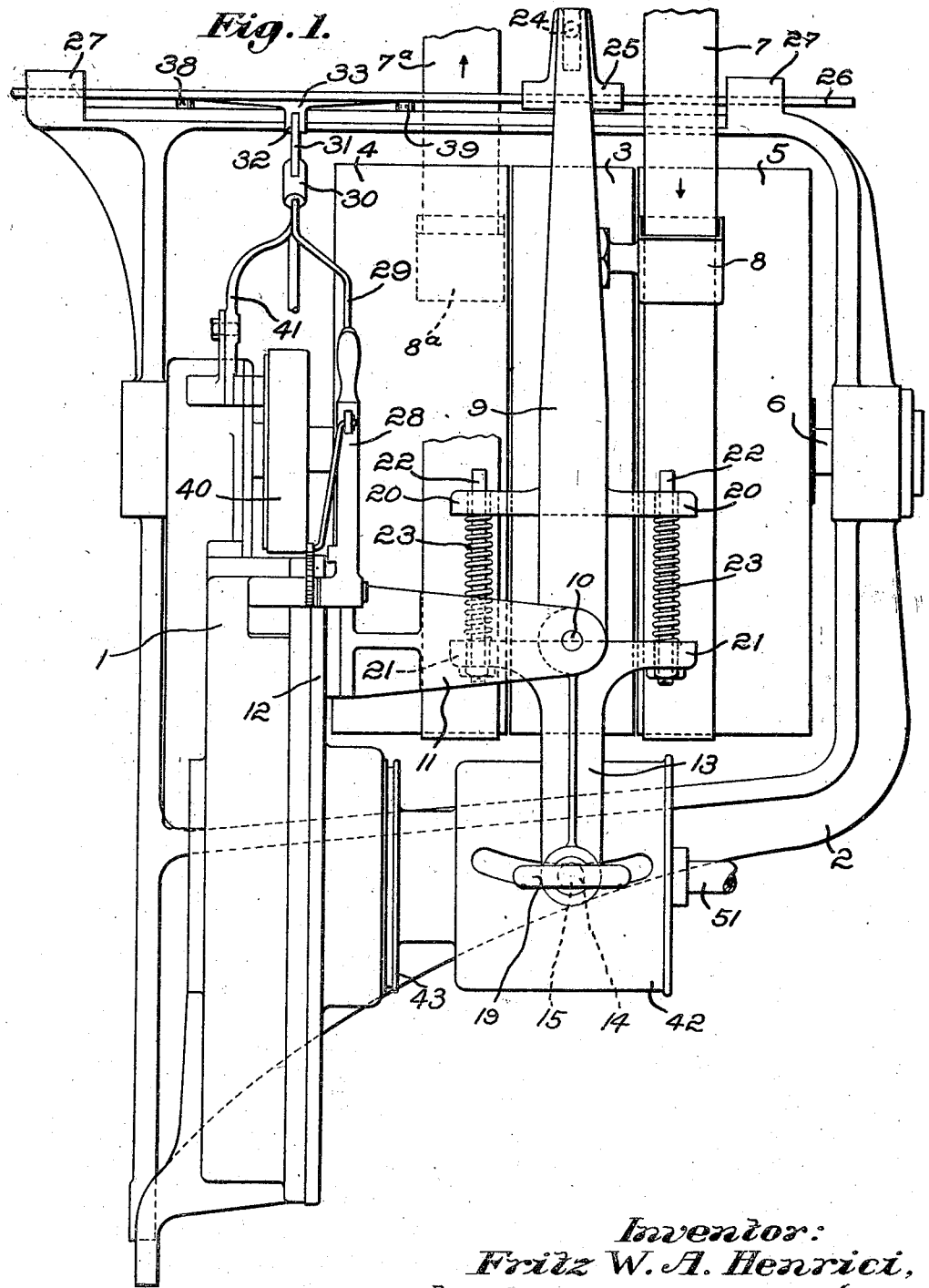

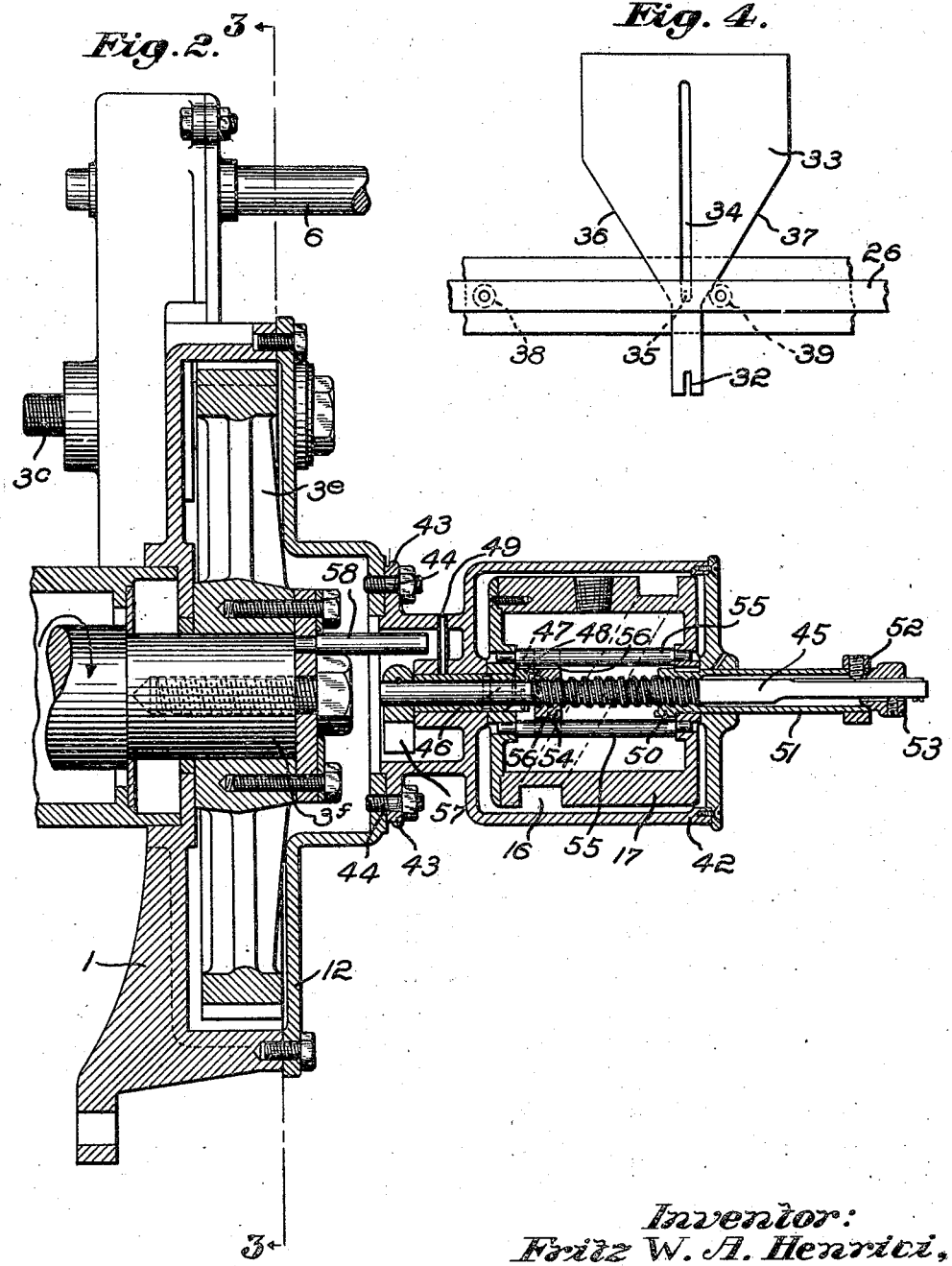

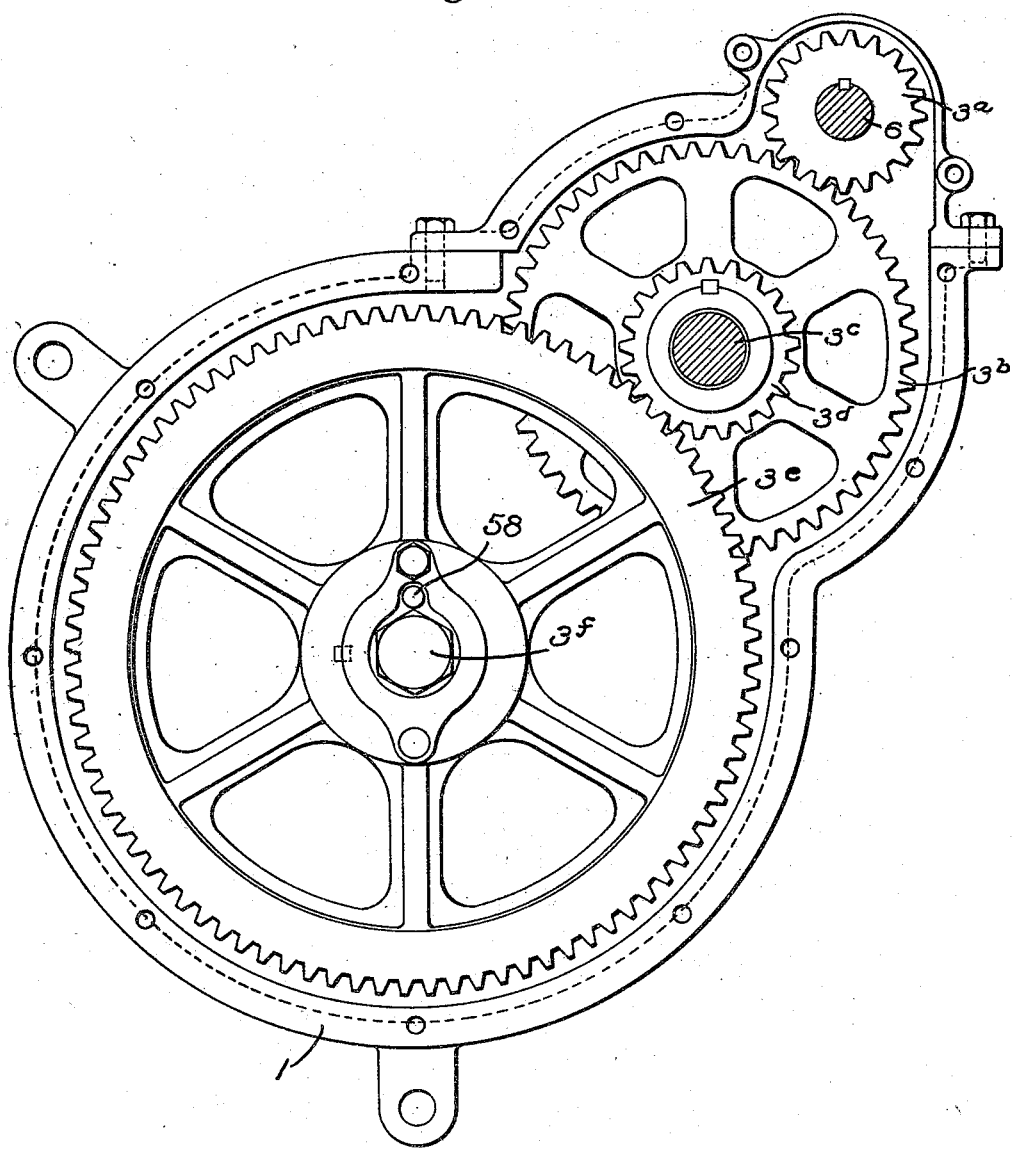

1,503,447

UNITED STATES PATENT OFFICE.

FRITZ W. A. HENRICI, OF BOSTON, MASSACHUSETTS, ASSIGNOR TO HENRICI LAUNDRY MACHINERY COMPANY, OF BOSTON, MASSACHUSETTS, A CORPORATION OF MASSACHUSETTS.

REVERSING MECHANISM.

Application filed September 15, 1919. Serial No. 323,845.

*To all whom it may concern:*

Be it known that I, FRITZ W. A. HENRICI, a citizen of the United States, and a resident of Boston, county of Suffolk, and Commonwealth of Massachusetts, have invented an Improvement in Reversing Mechanism, of which the following description, in connection with the accompanying drawings, is a specification, like characters on the drawings representing like parts.

This invention relates to reversing mechanism and its object is to provide an improved construction for that purpose applicable for use generally where periodical reversal of motion is desired, and particularly adapted for belt driven machines.

In the drawings of one embodiment of my invention which is illustrated and described herein, Fig. 1 is a side elevation;

Fig. 2, a partial vertical section on an enlarged scale;

Fig. 3, a view on the line 3—3 Fig. 2; and

Fig. 4, a plan detail of a portion of the manual belt shipping means.

My novel construction as herein shown, see Fig. 1, comprises a substantially flat upright frame 1 adapted to be properly secured to the end of the frame, not shown, of the member to be rotated.

This frame 1 has an outwardly extended yoke like member 2, in which is suitably mounted the driving pulley 3, and loose pulleys 4, 5, on the driving shaft 6. The shaft 6 carries, Fig. 3, a pinion 3ª, in mesh with a gear 3ᵇ on a stud 3ᶜ mounted in the frame 1, which latter stud also carries a pinion 3ᵈ in mesh with a gear 3ᵉ on the driven shaft 3ᶠ which extends through the frame 1.

The pulley 3 may be driven by belts 7, 7ª, from any source of power not shown, the belts being controlled by the guides 8, 8ª, on the upwardly extended shipper lever 9, one on either side of the pulley 3. This lever is shown mounted on a pivot 10 in the arm 11 carried by the plate 12 on the frame 1.

On this same pivot is also mounted a downwardly extended lever 13 which carries at its lower end a ball or roll 14 on a pin 15, see dotted lines, Fig. 1. The pin is normally retained, Fig. 2, by a spring not shown, in inward or operative position with its roll 14 in the groove 16, in the cam 17, the groove 16 crossing the surface of the cam roll 17 from left to right through 180° of the circumference and from right to left through the remaining 180°. The pin 15 has a handle 19 for manual manipulation, as for instance to start the machine.

The levers 9, 13 are provided with arms 20, 21 respectively which are operatively and yieldingly connected by pins 22 with springs 23 thereon, thus permitting, under normal conditions, the uniform motion of the two levers but allowing the retardation of either lever relative to the other in case at any time the first lever should meet any obstruction to free operation.

The lever 9 carries at its upper end and pivotally secured thereto at 24, Figs. 1, 4, a socket member 25 through which runs the shipper rod 26, mounted also for movement in the guides 27 on the frame 1.

For manually operating this shipper rod Fig. 1, to stop the machine, I provide a brake lever 28, connected by a link 29 and clevis 30 with a cam lever 31 suitably pivoted at its lower end, while its upper end is pivoted to the end 32 of the stopping cam 33.

This cam, Fig. 4, has a central slot 34, to receive a guide pin 35 in the frame 1 and is thus adapted for forward and backward movement by the lever 28. The cam 33 has cam surfaces 36, 37, each of which is adapted, under certain conditions, to engage either the roller 38 or 39 on the shipper rod 26. Obviously when the cam 33 is in its forward position as in Fig. 1, with the machine at rest, the cam rolls 38, 39, will be positioned one on each side of and at equal distances from the cam, with the shipper rod 26 so positioned that the two belts 7, 7ª, will both be on the loose pulleys 4, 5, and the machine will be at rest.

When the machine is to be started, the cam 33 is first pushed back by the lever 28 to free the rolls 38, 39, from engagement therewith and to permit travel of the shipper rod 26 when the shipper lever 9 is thrown to start the machine, as will be described.

I have provided a brake 40 which may be of any convenient construction, and here shown as a band brake, and which may be actuated simultaneously by the brake lever 28 when drawing the cam 33 forward to stop the machine. The brake may be connected by a link 41 with the cam lever 31 so that when the lever and cam 33 are pushed forward and the belts are shifted to the loose pulleys by the lever 28 and cam 33 the brake will be simultaneously applied.

For reversing the motion of the driven member at regular intervals I have invented novel timing and reversing mechanism which I will now describe.

On the plate 12 is secured, Fig. 2, a timer case 42 by means of flanges 43 and screws 44. In this case is mounted a reversing shaft 45, the construction being as follows: The shaft carries a bushing 46 pinned thereto as by a pin 47 dotted lines, Fig. 2, the bushing having a timer stop, such as a finger or dog 48 extended longitudinally therefrom. An oil tube 49 is provided in the bearing. On its opposite end and threaded thereto, the shaft 45 also carries a second timer stop 50 on an elongated bushing or timer regulator 51 the function of the latter being to determine the number of revolutions to be made by the driven member before reversal of motion takes place. This bushing 51 has, at its outer end a collar 52, by means of which the longitudinal adjustment of the timer regulator may be effected more conveniently.

The shaft 45 also has on its outer end a collar 53 to restrain the shaft against longitudinal movement to the left Fig. 2, and for rotative manual adjustment of the shaft when desired.

The reversing shaft 45 is threaded at its central section to receive a timer 54, in the form of a nut, which is restrained against rotative motion by two longitudinal bars 55 in the cam 17, and which extend through two slots 56 on opposite faces of the nut 54. The inner end of the shaft 45 carries a dog 57 which is engaged by post 58 on the end of the shaft 3ᶠ of the driven member.

The operation of the above construction is as follows:

Referring particularly to Fig. 2, the various parts are so proportioned that the driven axle 3ᶠ and its attached members are rotated several times while the timer nut 54 travels the length of the shaft 45 from the stop 48 to stop 50.

Assuming then that the driven member had been turning to the left as indicated by the arrow, and stopped with its several parts substantially in the positions shown in Fig. 2 it will be seen that, with the extreme right and left sections of the cam path 16 at the top and bottom respectively of the cam 17, the roll 14 on the shipper lever 13 will be substantially at the center of the path of travel, laterally, and the lever 9 consequently in the upright position shown in Fig. 1.

If now one throws the cam 33 back as in Fig. 4, by the lever 28 then grasps the handle 19 and thrusts it to the left, or in the direction permitted by post 58 Fig. 2, it will turn the cam roll 17 one quarter turn, in this case to the right, or in a direction opposite to that indicated by the arrow, and the extreme left hand section of the path 16 will be on a level with the shaft 45. This movement of the lower end of the lever 9 will throw the upper end of the lever and with it the belt 7ᵃ running in the direction of the arrow, to the right, bring the belt 7ᵃ onto the fast pulley 3 and causing it and the driven member 3ᶠ to rotate in the opposite direction to that in which it has been rotating. This will cause the timer 54 to travel in the opposite direction, or toward the right, Fig. 2.

This movement will continue until the timer nut 54 reaches and contacts with the stop 50, on the bushing 51, which is rotating to the right. The timer 54, thus being prevented from travelling any further to the right, it will turn the roll 17 by its engagement with the rods 55 thereon, a half turn to the right, or in the same direction that the shaft 45 is rotating.

This rotation of the frame 17 will, by virtue of the cam 17 and roll connections 14 therewith, throw the upper end of the lever 9 and belt 7ᵃ to the left, and throw belt 7ᵃ onto the loose pulley 4 and the belt 7 rotating in the opposite direction, onto the fast pulley 3 and thus cause the driven member to rotate in the opposite direction, or in the direction of the arrow. This will cause the timer 54 to travel back again toward the left, Fig. 2, during this rotation of the shaft 3ᶠ until the timer 54 contacts with the stop 56.

This contact will cause a partial rotation of the cam 17 in the opposite direction again with reversal of the positions of the belts 7 and 7ᵃ, throwing belt 7 onto the loose pulley 5, and causing the belt 7ᵃ to again operate the pulley 3 and driven member 38 in the opposite direction. Obviously the number of rotations of the driven member in either direction will be determined by the distance to be travelled by the timer nut 54, before the machine is stopped and reversed, which distance is regulated by the position of the sleeve 51 relative to the shaft 45.

When the machine is to be stopped the lever 28, link 29, and cam 33 are pulled forward so that either cam faces 36 or 37 as the case may be, will contact with either roll 38 or 39 and move the lever 26 longitudinally and position rolls 38, 39, on opposite sides of the cam 33 or on the opposite faces 36, 37. This will throw the belts 7ᵃ and 7 into the position shown in Fig. 1 with the belts both running on loose pulleys 4 and 5. The pulling forward of the lever 28 will also simultaneously apply the band brake 40 and stop the machine.

My invention is not restricted in all details to the embodiment thereof herein shown.

Claims:

1. Reversing mechanism comprising an operating pulley, a plurality of idlers, a driven member, connections between the same and the operating pulley, a belt on each idler running in opposite directions, a belt shipper, a reversing shaft rotated by the driven member, and connections between the shipper and reversing shaft including a two part yieldingly connected shipper lever, permitting relative retardation of one lever member, to reverse the direction of motion of the operating pulley.

2. Reversing mechanism comprising a driven member, an operating pulley adapted to be connected with the driven member, a plurality of idlers and belts thereon running in opposite directions, a belt shipper, a reversing shaft operated by the driven member, a reversing cam thereon, and connections between the shipper and cam including a lever having movable connection with the cam, a lever connected with the shipper, and yielding connections between said levers, permitting relative retardation of one lever, to reverse the direction of motion of the operating pulley.

3. Reversing mechanism comprising a driven member, an operating pulley adapted to be connected with the driven member, a plurality of idlers and belts thereon running in opposite directions, a belt shipper, a reversing shaft operated by the driven member, a reversing cam thereon, and connections between the shipper and cam to reverse the direction of motion of the operating pulley, and a timer to determine the time of reversal.

4. Reversing mechanism comprising an operating pulley, a plurality of idlers, belts thereon running in opposite directions, a belt shipper having a cam roll, a reversing shaft rotated by the driven member, a reversing cam on the shaft in operative engagement with the cam roll to reverse the direction of motion of the operating pulley and a timer to determine the time of reversal.

5. Reversing mechanism comprising an operating pulley, a plurality of idlers, belts thereon running in opposite directions, a belt shipper having a cam roll, a reversing shaft rotated by the driven member, a reversing cam on the shaft in operative engagement with the cam roll to reverse the direction of motion of the operating pulley and a timer to determine the time of reversal, and a timer regulator to regulate the time period between the reversals of motion.

6. Reversing mechanism comprising a driven member an operating pulley, a plurality of idlers, belts thereon running in opposite directions, a belt shipper, a reversing shaft operated by the driven member, connections between the shipper and shaft to reverse the direction of motion of the operating pulley and manually operative means including a cam acting on the shipper to shift the latter to stop the driven member.

7. Reversing mechanism comprising an operative pulley, idlers with belts running in opposite directions, a belt shipper, a reversing shaft, a reversing cam thereon with timer guides, a timer within the cam and in operative engagement with the guides, and stops on the reversing shaft engaging the timer alternately to reverse the direction of motion thereof.

8. Reversing mechanism comprising an operative pulley, idlers with belts running in opposite directions, a belt shipper, a reversing shaft, a reversing cam thereon with timer guides, a timer within the cam and in operative engagement with the guides, stops on the reversing shaft engaging the timer alternately to reverse the direction of motion thereof and regulating means for one of the stops whereby it may be caused to regulate the time of reversal of the timer and operating pulley.

9. Reversing mechanism comprising an operative pulley, idlers with belts running in opposite directions, a belt shipper, a reversing shaft, a reversing cam thereon with timer guides, a timer within the cam and in operative engagement with the guides, a fixed stop on the shaft, a sleeve also on the shaft carrying a stop and adjustable relative to the first stop to regulate the time of alternate engagement of timer by the stops to reverse the direction of the operative pulley.

10. Reversing mechanism comprising a frame, a yoke thereon, a driven member, a shaft adapted to be placed in operative connection with the driven member, pulleys on the shaft, a reversing shaft adapted to be operated by the driven shaft but disconnected therefrom, a travelling timer on the reversing shaft, stops also thereon for the timer, a hollow cam on the shaft and enclosing the same, timer guides on the cam engaged by the timer to turn the roll, and a belt shipper actuated by the roll to reverse the direction of rotation of the operating pulley.

11. Reversing mechanism comprising the driving pulley 3, idlers 4, 5, the belt shipper 9 controlling the same, the driven member 3', the reversing shaft 45 actuated by the driven member, the reversing cam roll 17 thereon with the cam groove 16, timer guides 55, on the cam, the timer 54 on the reversing shaft and in operative relation to the guides, the timer stop 48 on the reversing shaft, timer regulator 51 also on the reversing shaft and movable relative to the stop 48 to determine the period of rotation between the rotations of the cam and reversal of motion of the driving pulley.

12. Reversing mechanism comprising a frame, a yoke thereon, an operating shaft, operating and idling pulleys thereon, a belt shipper on the frame and a stopping cam in operative connection with the shipper and means for operating the cam, and a brake on the operating shaft adapted to be actuated and controlled simultaneously with the stopping cam.

13. Reversing mechanism comprising a frame, a yoke thereon, a driven member, a shaft adapted to be placed in operative connection with the driven member, pulleys on the shaft, a reversing shaft adapted to be operated by the driven shaft but disconnected therefrom, a travelling timer on the reversing shaft, stops also thereon for the timer, a hollow cam on the shaft and enclosing the same, timer guides on the cam engaged by the timer to turn the roll, and a belt shipper actuated by the roll to reverse the direction of rotation of the operating pulley, and yieldingly connected and actuated levers for imparting action by the cam roll to the belt shipper.

14. Reversing mechanism comprising a support, a plurality of driving members mounted thereon, operating elements for said members, a controlling lever for the operating elements also mounted on the support, a cam on the support, a roll on the controlling lever in operative relation to the cam, a reversing shaft adapted to be operated by the driven member, a timer operated by the reversing shaft and in operative connection with the cam, stops for the timer also operatively connected to the cam and acting, by limiting the travel of the timer, to move the cam and controlling lever to reverse the direction of movement of the driving members.

15. Reversing mechanism comprising a driven member, a driving member, transmission means connecting the latter with a source of power, a reversing shaft operated from the driven member, a timer threaded on the reversing shaft, stop members also threaded on the shaft to cooperate with the timer, means on the shaft for changing the position of one stop, a cam roll also on the reversing shaft controlled by the timer, and a resilient lever controlled by the cam roll for controlling in turn the power transmission means.

16. Reversing mechanism comprising a frame 1, a driven member $3^f$ therein, a driving pulley 3, idlers 4, 5, bolts 7, $7^a$ therefor, gears $3^a$, $3^b$, $3^e$, connecting said member $3^f$ with the member 3, a reversing shaft 45 actuated by the member $3^f$, a timer member 54 threaded to the member 45, and having slots 56 therein, timer stops 48 and 50 and regulator 51 also on the shaft 45, the cam 17 on the shaft 45 having guide bars 55 positioned in said slots 56, said cam 17 having a groove 16 thereon, a lever 13 pivoted to the frame 1, and having a roll 14 on its lower end and in said groove 16, a shipper lever 9 also pivoted to the frame 1 and constructed and arranged to control the members 7, $7^a$, resilient connections 22, 23 between the levers 9 and 13, a shipper lever 26 and starting and stopping cam 33 to control said shipper lever.

In testimony whereof, I have signed my name to this specification.

FRITZ W. A. HENRICI.